United States Patent [19]
Tonami et al.

[11] Patent Number: 5,203,051
[45] Date of Patent: Apr. 20, 1993

[54] GROMMET AND METHOD OF INSERTING GROMMET

[75] Inventors: Sunao Tonami, Aichi; Naoto Horiguchi, Sasebo; Sotoaki Yamamoto, Kariya; Hiroshi Kazino; Masaaki Ide, both of Komaki; Hideki Kakamu, Gifu; Tomiyasu Kakeno, Konan, all of Japan

[73] Assignee: K.K. Aoyama Seisakusho, Nagoya, Japan

[21] Appl. No.: 802,864

[22] Filed: Dec. 6, 1991

[51] Int. Cl.$^5$ ................................. B16L 5/00
[52] U.S. Cl. ............................. 16/2; 16/43; 29/525.1; 52/509; 403/194
[58] Field of Search ............ 403/194, 238, 197, 239; 29/525, 525.1; 52/464, 509

[56] References Cited

U.S. PATENT DOCUMENTS

| | | | |
|---|---|---|---|
| 3,057,001 | 10/1962 | Rapata | 16/2 |
| 3,065,004 | 11/1962 | Laich | 16/2 |
| 3,654,382 | 4/1972 | Rubright | 16/2 |
| 4,675,937 | 6/1987 | Mitomi | 16/2 |
| 4,757,664 | 7/1988 | Freissk | 16/2 |

FOREIGN PATENT DOCUMENTS 61-46245 12/1986 Japan .

Primary Examiner—W. Donald Bray
Attorney, Agent, or Firm—Cushman, Darby & Cushman

[57] ABSTRACT

A grommet for automatic insertion into a mounting hole in a panel by a robot including a head portion 1 having a longitudinal bore for receiving a screw through its center, a bottom portion 3 including a stepped portion 7 elastically engaging the robot arm located within the longitudinal bore; and locking claws 4 attached to the grommet which reflect during insertion of the grommet into the mounting hole and then spring snap into engagement when the locking claws 4 clear the mounting hole, such that the force required to disengage the robot arm 5 from the stepped portion 7 is less than the force required to extract the grommet from the panel, which enables the robot to easily determine whether or not the grommet is accurately inserted into the mounting hole.

8 Claims, 2 Drawing Sheets

GROMMET AND METHOD OF INSERTING GROMMET

The present invention relates to a grommet for insertion into the hole of a workpiece. The invention also relates to a method for automatically inserting a grommet into a hole in a workpiece.

BACKGROUND OF THE INVENTION

Widely used in, for example, an an automobile assembly line and the like, is a grommet composed of a head portion having a screw hole defined through its center. Locking claws are disposed on the lower surface of the head portion. The locking claws are expanded when a screw is threaded in the screw hole. The grommet, however, is conventionally inserted by hand into a corresponding mounting hole of a member or workpiece screw is then screwed into the grommet. Thus, the speed of the line is difficult to increase because the grommet insertion is carried out by hand.

To cope with this problem, it has been attempted to hold the grommet by the extreme end of a robot arm and automatically insert it into a mounting hole. However, whether the grommet is accurately inserted into a mounting hole by the robot arm is unknown. Therefore, a means to determine whether the grommet is accurately inserted must be solved in order to develop a method for automatically inserting a grommet into a workpiece.

SUMMARY OF THE INVENTION

It is therefore an object of the present invention to solve the above mentioned problems and to provide a grommet which can be automatically inserted into a mounting hole and which enables a robot to easily determine whether or not the grommet is accurately inserted.

The above and other objects of the present invention can be accomplished by a grommet including a head portion having a longitudinal bore for receiving a screw through its center, and locking claws attached to the grommet for engaging the panel between the locking claws and the head portion. When the grommet is inserted in the mounting hole and the locking claws 4, which had been deflected during insertion, clear the mounting hole, the locking claws 4 are released to spring snap into engagement with the side of the panel opposite from the head portion 1. The locking claws are further expanded when a screw is threaded into the longitudinal bore. The grommet also comprises a stepped portion formed around the inner surface of the screw hole for being elastically engaged with the the extreme end of a robot arm.

Further features objects and advantages of the present invention will become apparent from the Detailed Description of the Preferred Embodiments which follows when considered together with the attached Figures.

DESCRIPTION OF THE PREFERRED EMBODIMENTS

Figure 1:
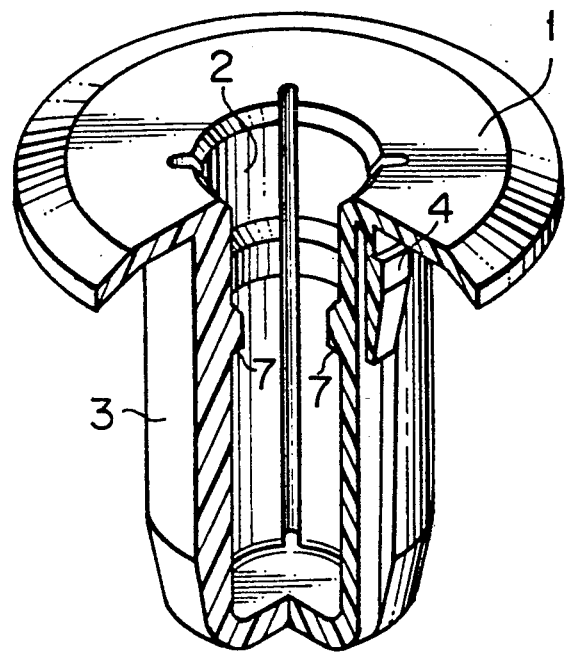
FIG. 1 is a perspective view, partially in cross section, showing a first embodiment of the present invention.

Next, embodiments of the present invention will be described in detail with reference to the drawings in which like parts are described by like reference numerals.

Figure 2:
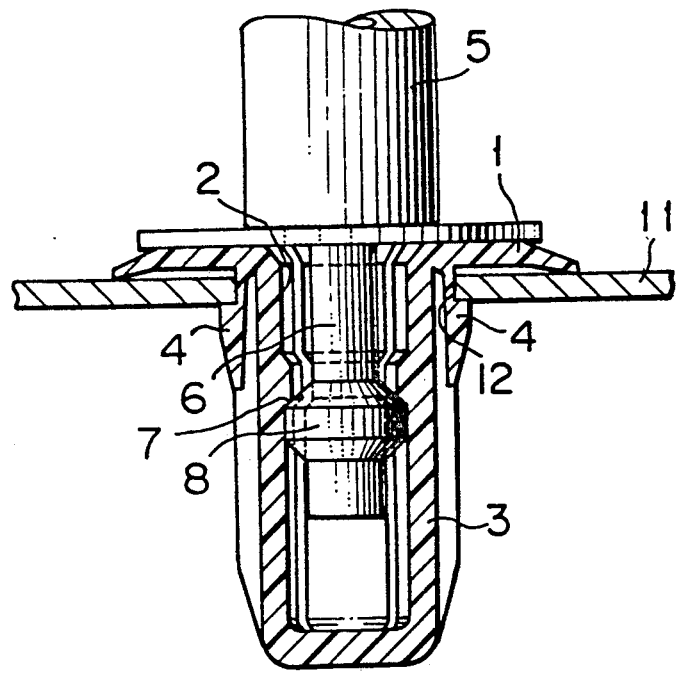
FIG. 2 is a side view, partially in cross section, showing the grommet of the embodiment being inserted.

To describe a first embodiment shown in FIGS. 1 and 2, a grommet comprises a disk-shaped head portion 1 composed of a tough synthetic resin material such as a nylon resin or the like having a longitudinal bore or screw hole 2 defined through its center, and a closed-bottom holder 3. Having a square cross section. The bottom portion or closed-bottom holder 3 is integrally connected to the lower surface of the head portion 1. A pair of locking claws 4, are also attached to the lower surface of the head portion 1 and extend toward the bottom of the holder 3. The locking claws 4 are disposed at the opposite locations on the outer circumference of the holder 3. When the grommet is inserted into the mounting hole and the locking hole and the locking claws 4, which had been deflected during insertion, clear the mounting hole, the locking claws 4 are released to spring snap into engagement with the side of the panel opposite from the head portion 1. After the grommet has been inserted into a mounting hole, and the robot arm retracted these locking claws 4, are further outwardly expanded by a screw threaded into the grommet.

In this embodiment, a boss or stepped portion 7 is formed around the inner circumference of the screw hole 2 so that the stepped portion 7 can be elastically engaged with the pin 6 of the extreme end of a robot arm 5. As shown in FIG. 2, the pin 6 has an enlarged portion 8 which is inserted into the screw hole 2 to hold the grommet. The grommet according to the present invention is arranged so that it cannot be extracted unless the expanded portion 8 of the pin 6 is engaged with the boss or stepped portion 7 and then a force of a predetermined magnitude or more is applied thereto.

Figure 3:
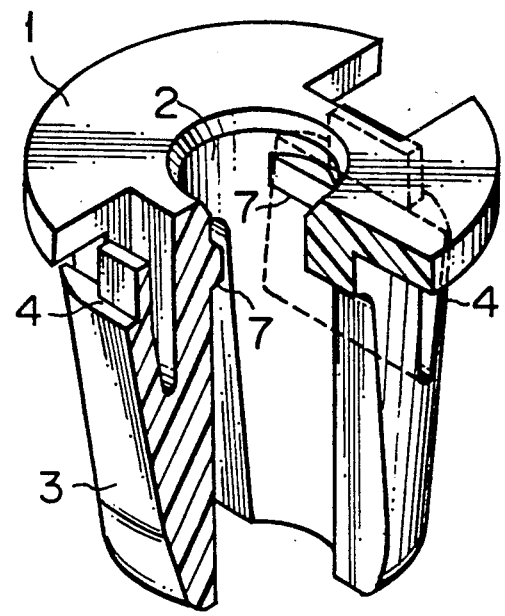
FIG. 3 is a perspective view, partially in cross section, showing a second embodiment of the present invention.
Figure 4:
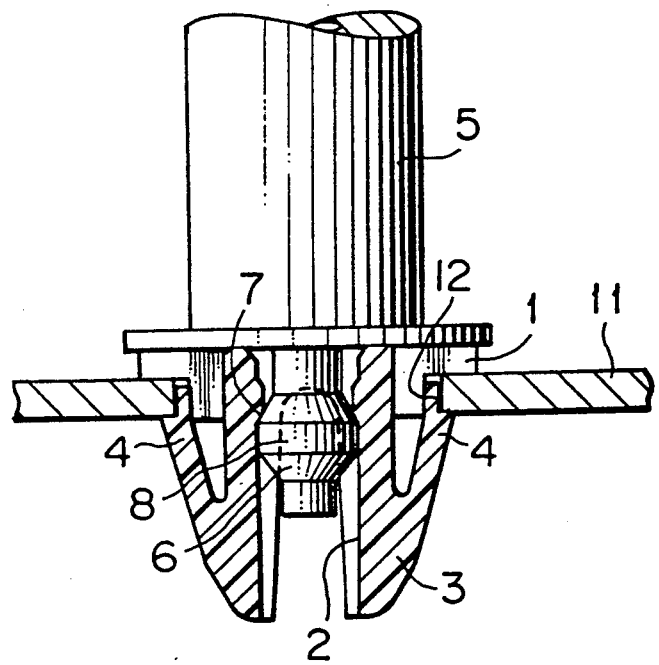
FIG. 4 is a side view, partially in cross section, showing the grommet of the embodiment being inserted.

In a grommet according to a second embodiment shown in FIGS. 3 and 4, the configurations of the bottom portion or holder 3 and locking claws 4, are different from those of the first embodiment. As shown in FIG. 3, the holder 3 is divided into two portions. As a result, the lower portion of a screw hole 2 is composed of recessed portions each having an arc-shaped cross section and formed around the outer circumference of the holder 3. However, a stepped portion 7 to be engaged with the pin 6 of the extreme end of the robot arm 5 is formed at a relatively upper portion of the screw hole 2. This latter feature is similar to the first embodiment.

As shown in FIGS. 2 and 4, the grommet arranged as described above can be held by the robot arm in such a manner that the pin 6 at the extreme end of the robot arm 5 is inserted into the screw hole 2, and thus the grommet can be inserted into the mounting hole 12 of a panel 11 composed of a steel plate or the like. If the grommet is properly inserted into the mounting hole 12, the upper ends of the upward locking claws 4, are locked with the inner circumference of the mounting hole 12 so that the grommet can be securely held on the panel 11. As a result, when the robot arm 5 is retracted thereafter, the pin 6 of the extreme end of the robot arm 5 is extracted from the screw insert hole 2 against the elastic locking force applied between the pin 6 and the stepped portion 7. But, because the force required to remove the pin 6 is less than that required to remove the properly inserted grommet from the hole 12, the grommet remains in the panel 11.

However, if the grommet is not properly inserted into the mounting hole 12, the grommet is extracted from the mounting hole 12 together with the pin 6, because when the robot arm 5 is retracted, the locking force between the pin 6 and the stepped portion 7 is larger than the locking force between the grommet and the mounting hole 12. Therefore, whether or not the grommet is accurately inserted into the mounting hole 12 is determined depending upon the extracting force of the robot arm 5 when the pin 6 is extracted after the grommet has been inserted into the mounting hole 12. Therefore, the grommet according to the present invention does not require an operator to confirm whether or not the grommet is accurately mounted.

After the grommet has been inserted into the mounting hole 12 of the panel 11, a screw is threaded into the screw hole 2 and then the locking claws 4 are further expanded so that the grommet is strongly fixed to the member 11. This is similar to a conventional grommet.

As is apparent from the above description, according to the present invention, a stepped portion is formed around the inner circumference of a screw hole, which portion is adapted to be elastically engaged with a pin at the extreme end of a robot arm. The grommet can therefore be automatically inserted into a member, to be attached by a screw. Whether or not the grommet is properly inserted can be determined by the magnitude of the force needed for extracting the pin of the robot arm from the grommet. Consequently, the present invention can solve the problem of the conventional grommet.

The present invention has been illustrated by means of preferred embodiments, however, one of ordinary skill in the art will recognize that modifications and improvements can be made while remaining within the scope and spirit of the present invention. The scope of the invention is determined solely by the appended claims.

What is claimed is:

1. A grommet for automatic insertion into a mounting hole in a panel, by a robot arm, comprising:
   a member having a head portion and a bottom portion integrally attached to said head portion at one side of said head portion and at least one locking claw attached to said member,
   said member having a longitudinal bore extending through said head portion and at least a major portion of said bottom portion,
   said head portion having an outer periphery larger than the inner circumference of the mounting hole,
   said bottom portion having an outer periphery smaller than the inner circumference of the mounting hole and having a stepped portion located within said longitudinal bore,
   said outer periphery of said bottom portion surrounding said stepped portion being spaced from the inner circumference of the mounting hole so as to allow said bottom portion to expand when the robot arm is retracted,
   said stepped portion having an inside diameter smaller than that of said longitudinal bore for engaging the robot arm,
   said at least one locking claw having a free end extending outwardly from said member with said free end of said at least one locking claw being spaced from said member,
   each of said at least one locking claw being resiliently deflectable relative to the longitudinal axis of said member such that when said member is inserted in the mounting hole and after said free end of said at least one locking claw clears the mounting hole said free end of said at least one locking claw is released to spring snap into engagement with the side of the panel opposite from said head portion such that the force required to deflect said stepped portion and expand said bottom portion and thereby retract the robot arm is less than the force required to remove said grommet from the mounting hole after said at least one locking claw has snapped into engagement with the opposite side of the panel.

2. A grommet for automatic insertion into a mounting hole in a panel as recited in claim 1, wherein said at least one locking claw is attached to said head portion, said longitudinal bore extends through said bottom portion.

3. A grommet for automatic insertion into a mounting hole in a panel as recited in claim 1, wherein said at least one locking claw is attached to said head portion.

4. A grommet for automatic insertion into a mounting hole in a panel comprising:
   a robot arm;
   a member engaging said robot arm, said member having a head portion and a bottom portion integrally attached to said head portion at one side of said head portion and at least one locking claw attached to said member,
   said member having a longitudinal bore extending through said head portion and at least a major portion of said bottom portion,
   said head portion having an outer periphery larger than the inner circumference of the mounting hole,
   said bottom portion having an outer periphery smaller than the inner circumference of the mounting hole and having a stepped portion located within said longitudinal bore,
   said outer periphery of said bottom portion surrounding said stepped portion being spaced from the inner circumference of the mounting hole so as to allow said bottom portion to expand when said robot arm is retracted,
   said stepped portion having an inside diameter smaller than that of said longitudinal bore for engaging said robot arm,
   said at least one locking claw having a free end extending outwardly from said member with said free end of said at least one locking claw being spaced from said member,
   each of said at least one locking claw being resiliently deflectable relative to the longitudinal axis of said member such that when said member is inserted in the mounting hole and after said free end of said at least one locking claw clears the mounting hole said free end of said at least one locking claw is released to spring snap into engagement with the side of the panel opposite from said head portion such that the force required to deflect said stepped portion and expand said bottom portion and thereby retract said robot arm is less than the force required to remove said grommet from the mounting hole after said at least one locking claw has snapped into engagement with the opposite side of the panel.

5. A grommet for automatic insertion into a mounting hole in a panel as recited in claim 4, wherein said at least one locking claw is attached to said head portion, said longitudinal bore extends through said bottom portion.

6. A grommet for automatic insertion into a mounting hole in a panel as recited in claim 4, wherein said at least one locking claw is attached to said head portion.

7. A method for automatic insertion of a grommet into a hole in a panel by a robot arm, comprising the steps of:

inserting the robot arm into said grommet and engaging a stepped portion located within said grommet, said grommet having a head portion and at least one locking claw, said locking claw having a free end extending outwardly from said grommet with said free end of said at least one locking claw being spaced from said grommet;

causing the robot arm to insert said grommet into the mounting hole in the panel such that when said grommet is inserted in the mounting hole and after said free end of said at least one locking claw clears the mounting hole, said free end of said at least one locking claw is released to spring snap into engagement with the side of said panel opposite from said head portion;

retracting the robot arm from the mounting hole thereby resiliently deflecting said stepped portion so that the robot arm is disengaged from said grommet; and measuring the force required to retract the robot arm to determine whether the grommet has been properly inserted.

8. A method according to claim 7, wherein the step of measuring the force required to retract the robot arm includes comparing the force measured against a predetermined amount for determining if whether the grommet is properly inserted.

* * * * *